No. 665,497. Patented Jan. 8, 1901.
W. O. WORTH.
MOTOR VEHICLE.
(Application filed June 12, 1899.)
(No Model.) 4 Sheets—Sheet 1.
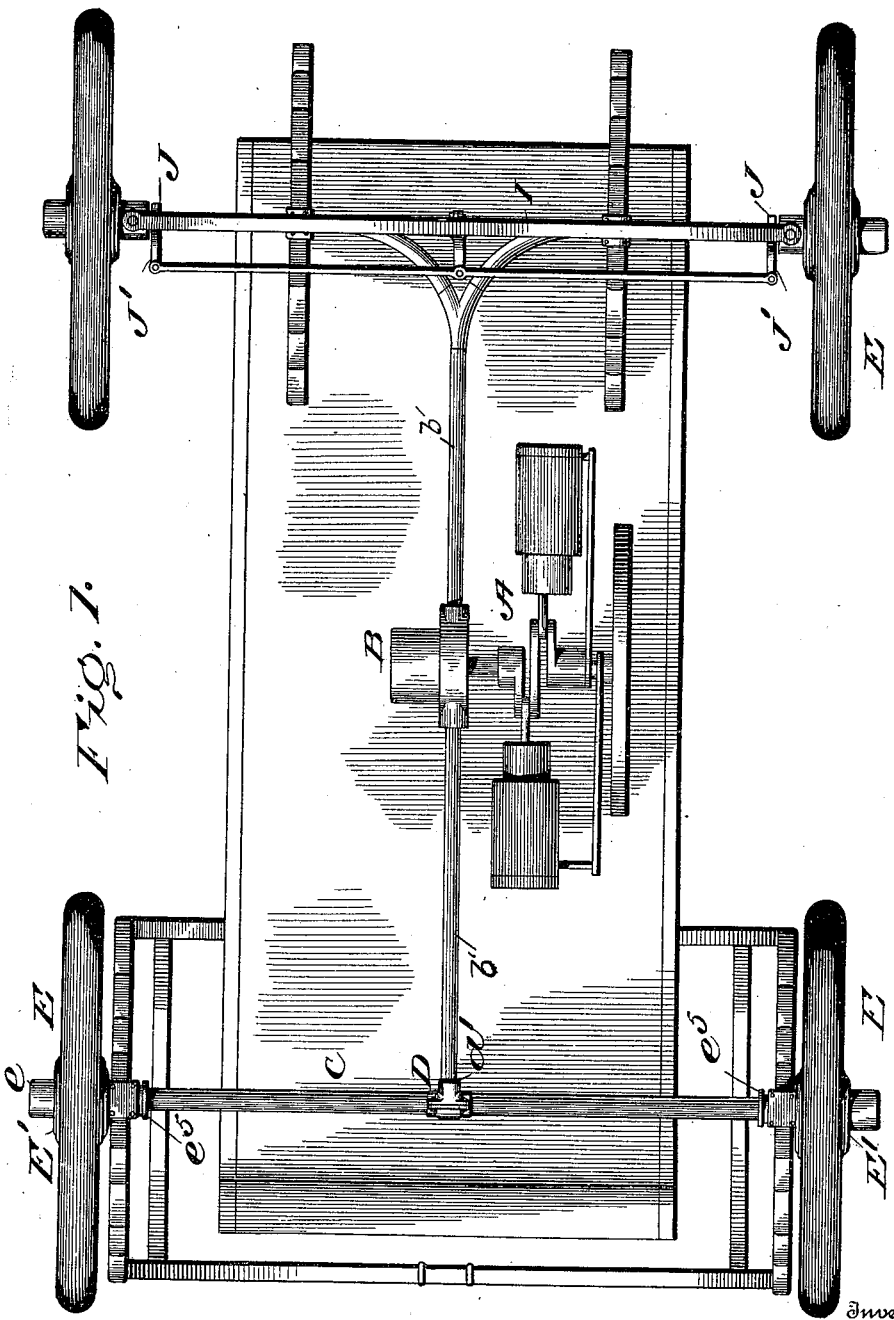

No. 665,497. Patented Jan. 8, 1901.
W. O. WORTH.
MOTOR VEHICLE.
(Application filed June 12, 1899.)
(No Model.) 4 Sheets—Sheet 2.
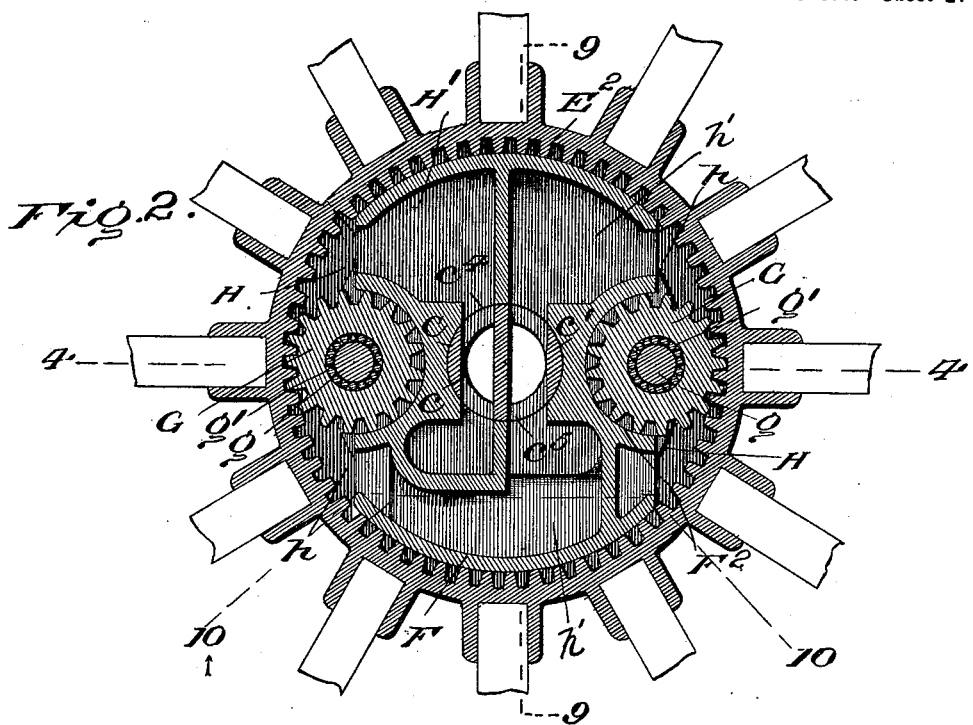
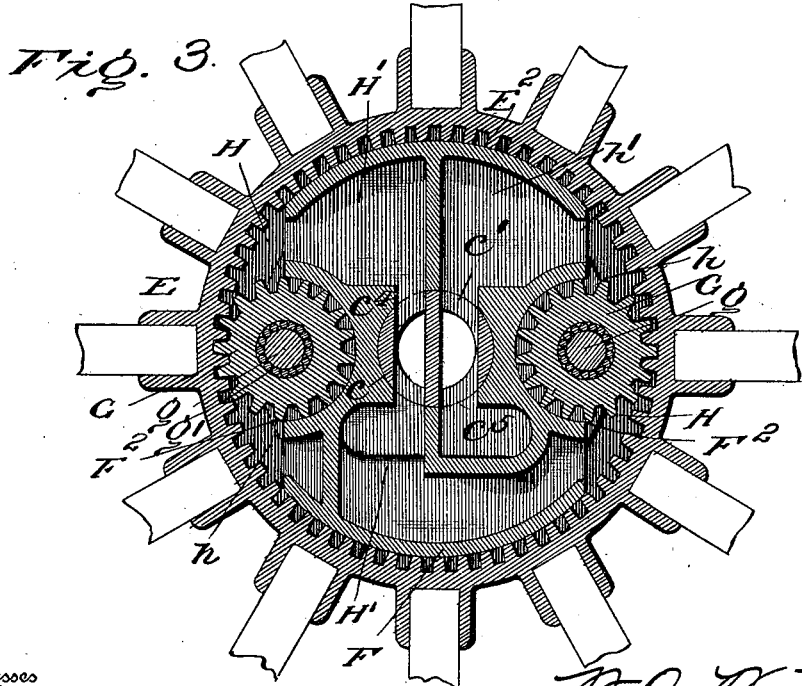
Witnesses
W Cleary Sullivan
H. S. Austin.
Inventor
W. O. Worth
by Alexander & Dowell
his Attorneys
THE NORRIS PETERS CO., PHOTO-LITHO., WASHINGTON, D. C.

No. 665,497. Patented Jan. 8, 1901.
W. O. WORTH.
MOTOR VEHICLE.
(Application filed June 12, 1899.)
(No Model.)
4 Sheets—Sheet 3.
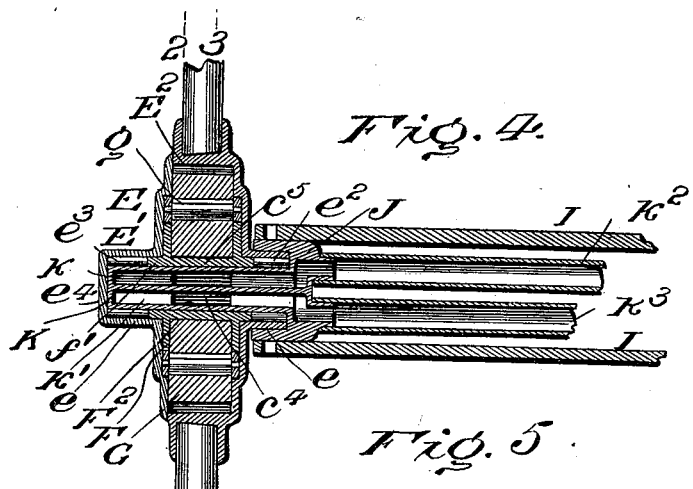
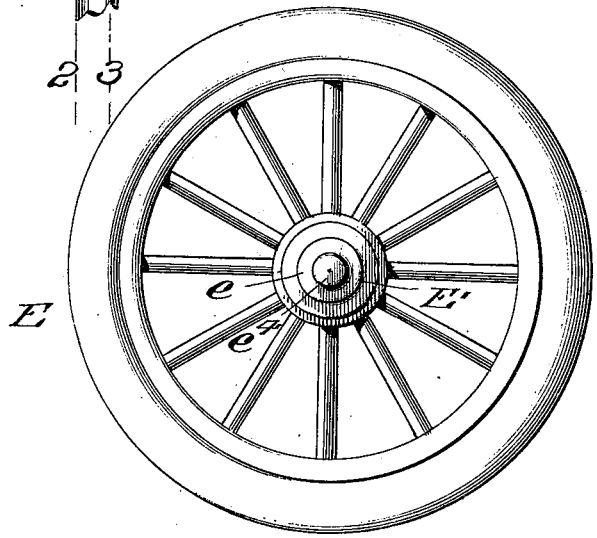
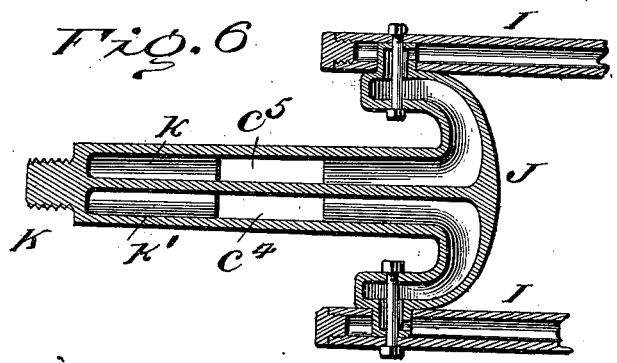
Witnesses
W Cleary Sullivan
H. S. Austin
Inventor
W. O. Worth
by Alexander & Dowell
his Attorneys No. 665,497. Patented Jan. 8, 1901.
W. O. WORTH.
MOTOR VEHICLE.
(Application filed June 12, 1899.)
(No Model.) 4 Sheets—Sheet 4.
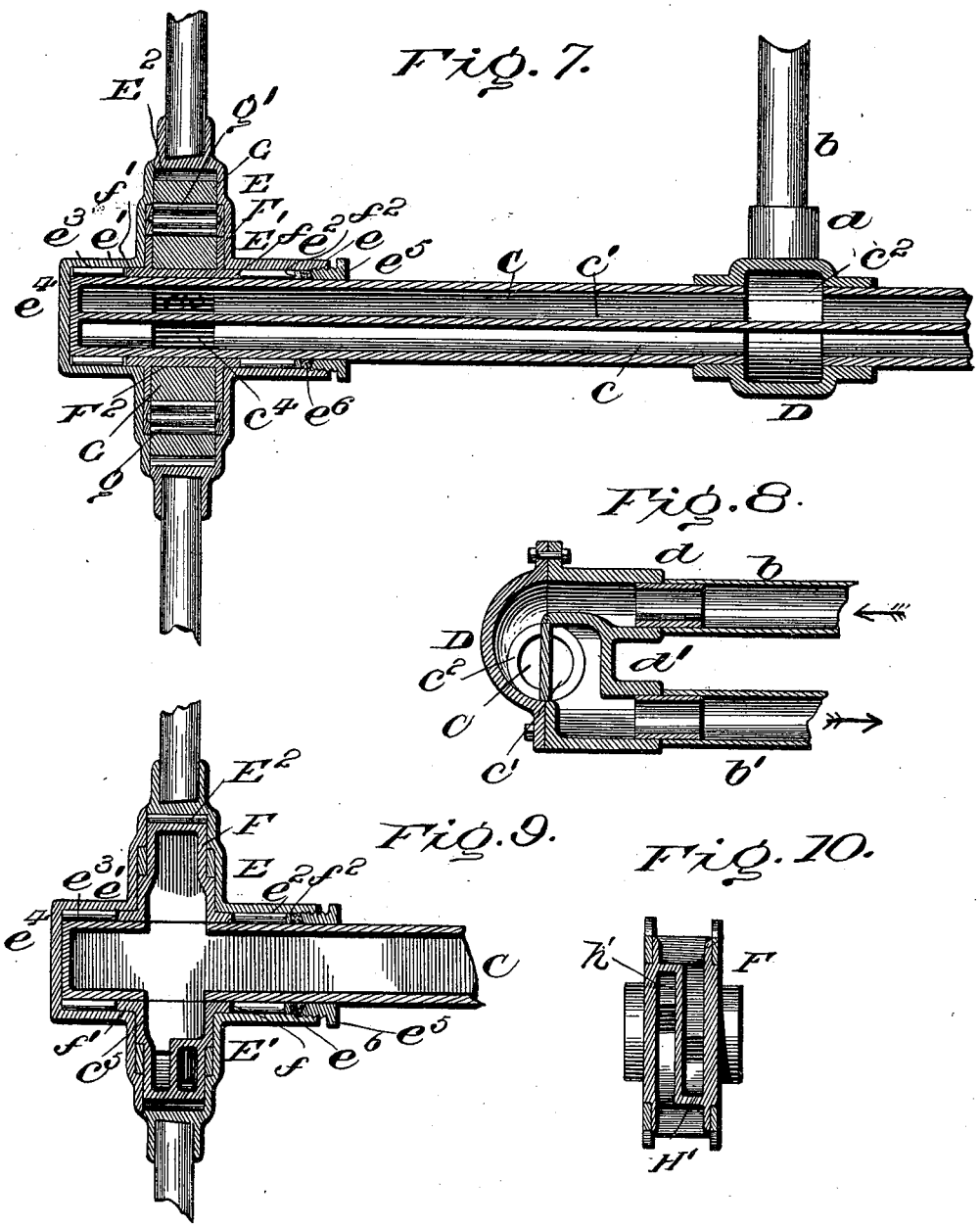

UNITED STATES PATENT OFFICE.

WILLIAM O. WORTH, OF CHICAGO, ILLINOIS, ASSIGNOR OF TWO-THIRDS TO WILLIAM R. DONALDSON, OF LOUISVILLE, KENTUCKY, AND HENRY W. KELLOGG, OF BATTLE CREEK, MICHIGAN.

MOTOR-VEHICLE.

SPECIFICATION forming part of Letters Patent No. 665,497, dated January 8, 1901.

Application filed June 12, 1899. Serial No. 720,281. (No model.)

*To all whom it may concern:*

Be it known that I, WILLIAM O. WORTH, of Chicago, in the county of Cook and State of Illinois, have invented certain new and useful Improvements in Motors and Motor-Vehicles; and I hereby declare that the following is a full, clear, and exact description thereof, reference being had to the accompanying drawings, which form part of this specification.

This invention is an improvement in motors and motor-vehicles.

The primary object of the invention is to provide a novel secondary motor which is driven by fluid-pressure from a prime motor and while originally designed for use on the motor-vehicle and shown applied thereto is nevertheless applicable in the arts for a variety of uses unnecessary to enumerate here, but which will be readily comprehended by those skilled in the art when acquainted with the mode of operation of the secondary motor and its efficient action and the novel manner in which it can be located for operation at any desired point.

Another principal object and characteristic novelty of this invention is to employ hydraulic-motor wheels on the vehicle or to locate secondary hydraulic motors in the hubs of some or all of the wheels of the vehicle, so that the power is applied directly thereto, the motor constituting part of the wheel and the latter rotating around a stationary axle or spindle, so that practically every wheel of the vehicle can be a motor and each wheel driven independently of the others. The advantages of such construction will be also better appreciated when the invention is fully explained.

Another object is to provide means for circulating the motive fluid from the prime motor to the secondary motors in a simple and efficient manner, so that when applied to motor-vehicles the supporting-axles or running-gear of the vehicle can be utilized as conduits for the motive fluid.

Without further generalization I would say that while I have shown in the accompanying drawings a motor-vehicle of simple and practical construction embodying my invention I do not limit myself to the precise constructions shown and described, except where specifically referred to by letters of reference in the claims, because of the capabilities and adaptabilities of the invention and the possible facility of modification thereof while utilizing the beneficial features of the invention.

Referring to the accompanying drawings, Figure 1 is a bottom plan view of a motor-vehicle, illustrating the arrangement of parts thereof, each wheel being indicated as constructed with a secondary hydraulic motor arranged within its hub, so that all four wheels are practically locomotive. Fig. 2 is an enlarged cross-section through the motor hub and axle of one of the wheels on line 2 2, Fig. 4. Fig. 3 is a similar view on line 3 3, Fig. 4. Fig. 4 is a reduced vertical longitudinal section through one motor-hub and front axle. Fig. 5 is a face view of a motor-wheel. Fig. 6 is a detail sectional view of one of the steering-wheel supports. Fig. 7 is a longitudinal section of the rear axle and one of the wheels thereon. Fig. 8 is a detail section through the coupling D. Fig. 9 is a perpendicular section through Fig. 7. Fig. 10 is a detail section of a casting F.

Referring to said drawings by letters, a prime motor A of any suitable construction is suspended under the bottom of the vehicle and operates a fluid-pump B, also of any suitable construction, which will produce a forcible circulation of fluid from the pump to the secondary motors in the hubs of the wheels through suitable conduits, as hereinafter described. I should say that I preferably employ oil as a fluid, as it should be substantially non-elastic and non-compressible, and the secondary motors might be called "hydraulic" motors and are adapted to be positively driven by the circulating currents of fluid. From the pump B the oil is forced through a pipe $b$ to the tubular rear axle C, which preferably is longitudinally divided into separate compartments $c\ c'$, one for the outflowing oil and the other for the return of oil. As shown, a double coupling-joint D is attached to the axle, this joint being made in halves fitted closely to the axle and having upper and lower pipe-sockets $d$ $d'$, Fig. 8, the former of which is connected to pipe $b$ and communicates with passage $c$ through an opening $c^2$ in the tubular axle C, while the latter is connected to a return-pipe $b'$, leading to the pump, and communicates with passage $c'$ through an opening $c^3$ in the axle C, as indicated in the drawings. The sockets $d$ $d'$ are on one half of the coupling, and the other half is bolted thereto, as indicated in Fig. 8 of the drawings.

On the ends of axle C are mounted two of the motor-wheels E. All being constructed alike, only one need be explained. The wheel E has a large hollow hub E', having annular bearing-flanges $e$ $e'$, by which it is supported upon the end of axle C, frictionless bearings being interposed between the bearing-flanges and axle, as at $e^2$ $e^3$. These bearings may be balls or rollers, the latter being shown. The outer end of hub E may be closed by a cap $e^4$ and the inner end by a stuffing-box ring $e^5$, fitted closely on the axle and screwed into the part $e$ of the hub against a packing $e^6$ therein, Figs. 7 and 9, so that the hub is both fluid-tight and dust-proof.

Within the hollow annular part of the hub is placed a casting F, in which are the pistons and ports of the motor. This casting F is supported on shaft C by short annular bearing-collars $f$ $f'$, Figs. 7 and 9, the bearings $e^3$ being confined between collar $f'$ and cap $e^4$ and bearings $e^2$ between collar $f$ and a ring $f^2$, against which packing $e^6$ is pressed. Casting F is firmly secured to the axle C and is provided at one, two, or more points with semicircular recesses $F^2$, in which are closely fitted gear-pistons G, which are journaled on shafts $g$, fitted in or secured to the sides of the casting F, as shown, and preferably are mounted on frictionless bearings, roller-bearings $g'$ being shown. The teeth of these pistons mesh with an internal annular gear $E^2$ in hub E', so that if the pistons G are rotated the hub will be turned. The pistons G are fitted very closely in recesses $F^2$, so that practically no oil or fluid can slip by the pistons, but must pass around them and rotate them in so doing. At each side of each piston G is a small chamber H $h$, respectively, chambers H being the inlet or working chambers and chambers $h$ the exhaust-chambers.

The fluid is conducted from passage $c$ in axle C through an opening $c^4$ into a chamber H', formed within casting $f$, said chamber H' communicating with both chambers H, as shown in Fig. 3. Fluid escapes from chambers $h$ into another chamber $h'$ in casting F, which latter chamber communicates with passage $c'$ in axle C through an opening $c^5$ therein. (See Fig. 2.) The casting F is shaped substantially as shown in the drawings, so that there will be no communication between the inlet and outlet oil-passages except by passing the pistons. The oil entering chambers H under pressure finds itself obstructed by the piston and begins to react against the gear $E^2$ and against that part of the pistons G within recesses $F^2$. Consequently there will be a tendency of the hub and casting F to move relatively to each other, and as the casting is fast on the shaft C and the latter rigidly connected to the body of the vehicle the hub is rotated, thus turning the wheel on the shaft, as is obvious. The oil thus circulates from the pump through pipe $b$ to the passage $c$ into chamber H' and chambers H to the pistons, thence through chambers $h$ and $h'$ to passage $c'$, to pipe $b'$, and back to the pump. Thus by forcing the oil continuously through the pipes and passages the motor-wheels are driven at more or less speed, according to the velocity, volume, and pressure of the current of oil. Practically the flow of oil is regulated so that any desired speed from minimum to maximum can be obtained. This can be accomplished by varying the speed of the engine, but preferably by valve mechanism of such character that the motors can be controlled without stopping the engine or prime motor. The mechanism and the preferred form of pump form subjects of other applications for patents.

Preferably for motor-vehicles the hubs E' can be provided with spokes, as usual, and cushion-tires or pneumatic tires of large size employed. I do not, however, deem it necessary herein to enter into details of construction which have no particular reference to the present invention. The front axle of the motor-vehicle is preferably differently constructed from the rear axle and (see Fig. 4) consists of a pair of parallel upper and lower bars I I, between and to the extremities of which are pivoted yokes J, which swing horizontally and are provided with rearwardly-extending arms J', which are connected together and to a suitable steering device (not shown) by which the yokes may be turned simultaneously.

Projecting from the center of each yoke J is a tubular spindle K, (see Figs. 4 and 6,) which is closed at its outer end and divided interiorly by a longitudinal partition into passages $k$ $k'$, which are connected, respectively, at rear to the ends of pipes $k^2$ $k^3$, pipes $k^2$ being connected by a coupling of any suitable construction with the pipe $b$, leading from the outlet of the pump, and pipes $k^3$ connecting with the pipe $b'$, leading to the inlet of the pump. Motor-wheels E constructed like that already described are mounted upon spindles K.

If preferred, instead of employing the pipes $k^2$ $k^3$ the construction shown in Fig. 6 might be adopted. In this the bars I I are shown as tubular and are respectively connected to pipes $b$ and $b'$. The arms and trunnions of yokes J are also made hollow and respectively communicate with passages $k$ $k'$, and the trunnions communicate with the interior of tubes I I, so that the oil is conducted to and from the motor-wheels on spindles K through the hollow bars I.

In a four-wheel vehicle each wheel travels at different speed in rounding a curve or turning, and in ordinary constructions this is a serious difficulty; but by the present invention each wheel being independent can increase or decrease its speed relatively to the others in turning the vehicle without injuring or straining the wheels, the motors, engine, or other working parts of the apparatus.

By this invention I can proportion the motors and the power utilized therein to the load to be borne or carried on each wheel. The front wheels ordinarily having less weight to carry than the rear wheels, their motors could be smaller, and the power can be distributed equally to the wheels according to their load.

In the vehicle shown and described each wheel is self-propelling or directly driven. This enables the power to be directly applied at the most effective point—to wit, the hubs of the wheels and to each wheel separately—and should any motor break down the others might suffice to get the vehicle home. In turning the advantages of having each wheel independently propelled will be obvious.

I believe myself to be the first to locate a fluid-motor in the hub of a wheel and the first to make a motor-vehicle with self-contained fluid-motor wheels or self-propelling wheels, also the first to use secondary motors for independently propelling each wheel. I do not intend herein to restrict myself to the secondary motor as applied to vehicle-wheels, for it can be readily adapted to other useful purposes, nor to restrict myself to the employment of the motor with the supporting-shaft stationary and the wheel revolving, as the motor could be readily adapted to operate reversely—that is, to rotate the shaft while the wheel part E' was fixed. As a motor-wheel the invention is particularly adapted for motor-vehicles of any description and is not restricted to employment on four-wheel vehicles.

By employing oil as the driving fluid I obtain the advantages of thorough lubrication of the working parts, lessening of friction of fluid in the conduits and passages, prevent oxidation of working parts, and avoid liability of freezing.

Finally, I do not confine myself to employment of non-elastic fluids, but prefer the use of them, because the power is more positively and certainly transmitted thereby.

Having thus described my invention, what I therefore claim as new, and desire to secure by Letters Patent thereon, is—

1. In a vehicle, the combination of a carrying-wheel, a prime fluid-motor located on the vehicle, and a secondary fluid-motor located in the wheel and driving the latter, substantially as and for the purpose described.

2. In a vehicle, the combination of supporting-wheels, and secondary fluid-motors in the hubs of said wheels; with a primary motor for circulating a current of fluid through each of said secondary motors, substantially as described.

3. In a vehicle, the combination of supporting-wheels having interior self-contained secondary fluid-motors, a fluid-pump, and fluid-conduits for conducting fluid from said pump to each of said motors and return, for the purpose and substantially as described.

4. In a vehicle, the combination of supporting-wheels having fluid-motors in their hubs, an engine carried by the vehicle and a pump operated by said engine; with fluid-conduits connecting the pump with the motors, for the purpose and substantially as described.

5. In a four-wheel vehicle, the combination of the supporting-wheels each having a fluid-motor; with a common fluid-forcing apparatus located upon the vehicle and means for conducting fluid to and from the motors, substantially as described.

6. In a motor the combination of the opposite gear-pistons, the annular gear meshing therewith, and the inlet and outlet chambers at opposite sides of the pistons; with means for introducing fluid under pressure into said inlet-chambers and conducting it from said outlet-chambers, for the purpose and substantially as described.

7. The combination of the casting having a semicircular recess, the gear-piston in said recess, and an annular gear surrounding said casting and meshing with said piston; with means for introducing fluid under pressure at one side of the piston and withdrawing it at the opposite side, for the purpose and substantially as described.

8. The combination of the annular gear, the casting mounted therein having semicircular recesses, gear-pistons journaled in said recesses and meshing with said annular gear, inlet and outlet chambers at opposite sides of each piston, and means for admitting operating fluid into the outlet-chambers and withdrawing it from the inlet-chambers, substantially as described.

9. The combination of the casting having semicircular recesses in opposite sides, the gear-pistons journaled in said recesses, and fluid inlet and outlet passages, with the wheel-hub inclosing said castings and gear-pistons having an annular gear meshing with said pistons, all substantially as described.

10. The combination of the gear-pistons, the working and exhaust chambers at opposite sides of each piston, and central inlet and outlet passages, the branched passage connecting the central inlet-passage with the working chambers, and the opposite branched passage connecting the exhaust-chambers with the outlet-passage; with the annular gear surrounding said passages and chambers and meshing with said pistons, for the purpose and substantially as described.

11. The combination of the axle-spindle, the casting attached thereto, the gear-pistons journaled in said casting, the annular hub or casting fitted on the shaft and inclosing said casting and gear-pistons, and an annular gear in said hub meshing with said pistons, all substantially as and for the purpose described.

12. The combination of the axle-spindle, the casting attached thereto, the gear-piston journaled in said casting, the annular hub or casting fitted on the shaft and inclosing said casting and gear-pistons, and an annular gear in said hub meshing with said pistons; with inlet and outlet passages in the shaft, and passages in said casting leading from said inlet-passage to working chambers on one side of said pistons, and from exhaust-chambers at the other side of said pistons to the outlet-passage all substantially as described.

13. In a motor-vehicle the combination of the front axle, the yokes pivoted to the ends thereof and capable of swinging horizontally having hollow spindles provided with fluid inlet and outlet passages, and means for conducting an operating fluid to and from said passages; with a wheel on said spindle having an internal motor driven by the fluid conducted to it through the passages in said spindle, substantially as described.

14. In a motor-vehicle the combination of the wheels the fluid-motors for operating the wheels located in the hubs thereof, an engine, a fluid-circulating pump, and conduits for conducting the fluid from the pump to the motors and back, substantially as described.

15. In a motor-vehicle, the combination of the tubular rear axle having outlet and return passages, and the wheel-motors journaled on the ends of said axle, and having a stationary part fixed to the axle and communicating with the passages therein, substantially as and for the purpose described.

16. In a motor-vehicle, a wheel-motor consisting of castings F fixed on the axle, gear-pistons journaled in said casting, an annular gear surrounding said casting and gears and meshing therewith, said gear being secured to and within the hub of the wheel which also forms the exterior casing of the motor, for the purpose and substantially as described.

17. In a motor-vehicle, the combination of the hollow rear axle, and the supporting-wheels, having motors within their hubs, said motors comprising a casting F fixed on the axle and provided with fluid-passages communicating with the passages in the axle, gear-pinions G journaled in semicircular recesses in said casting, and an annular gear $E^2$ surrounding said gear-pistons and casting and meshing with the pistons, said annular gear being fixed in the hollow hub of the wheel which hub forms the exterior casing of the motor, substantially as described.

18. In a motor-vehicle, a wheel-motor consisting of castings F fixed on the axle, gear-pistons journaled in said casting, an annular gear surrounding said casting and gears and meshing therewith, said gear being secured to and within the hub of the wheel which also forms the exterior casing of the motor; with an engine attached to the vehicle-body, a fluid-pump operated by said engine, and pipes connecting said pump with the passages in said axle, all substantially as and for the purpose set forth.

19. The combination of the shaft, the casting as F fixed thereon having opposite recesses F', and branched passages $H^2$ $H^3$ and $h^2$, $h^3$; with the gear-pistons G, G, and the annular hub E' inclosing said casting and piston having internal gear $E^2$ meshing with pistons G, all substantially as and for the purpose described.

20. The combination of the shaft C, the casting F secured thereon having oppositely-leading passages $h^2$, $h^3$, and $H^2$, $H^3$, and the gear-pistons G, G, journaled in semicircular recesses in said casting; with the hub E' fitted over said casting having internal gear $E^2$ meshing with said pistons, and also having bearing-flanges e, e', all substantially as and for the purpose described.

21. The combination with the tube or shaft, interior passages substantially as described, with the two-part coupling D, bolted around said shaft, and having pipe-sockets d, d', respectively communicating with different passages in said pipe through openings therein, but not communicating with each other, for the purpose and substantially as described.

In testimony that I claim the foregoing as my own I affix my signature in presence of two witnesses.

WILLIAM O. WORTH.

In presence of—
B. P. DONNELLY,
W. R. DONALDSON.